Jan. 28, 1969          H. L. DANIELS          3,424,918
                    PROCESS STEP CONTROLLER

Filed April 29, 1966

INVENTOR.
HOWARD L. DANIELS
BY Merchant & Gould
ATTORNEYS

United States Patent Office 3,424,918
Patented Jan. 28, 1969

3,424,918
PROCESS STEP CONTROLLER
Howard L. Daniels, St. Paul, Minn.
(272 Oakview Road, West St. Paul, Minn. 55118)
Filed Apr. 29, 1966, Ser. No. 546,319
U.S. Cl. 307—132                18 Claims
Int. Cl. H01h 51/34, 47/18

ABSTRACT OF THE DISCLOSURE

A basic step controller for sequentially activating a series of pre-selected groups of an array of controlled devices, each group representing a single step of a program. The duration of any one or more of such steps can be controlled by elapsed time. When the basic step controller reaches a time controlled step, a timing device is energized to provide a train of impulses to operate a second stepping device. The second stepping device accumulates a pre-selected count of impulses and then energizes the basic step controller to move it a single step. Means are also provided to return the second stepping device to a home position prior to energizing the basic step controller, and to deenergize the timing device when the basic step controller steps.

---

The present invention utilizes stepping switches to perform various functions that are necessary to the operation of the invention. Stepping switches are devices designed to move one or more wipers through a sequence of successive, discrete steps, in each of which the wiper closes a circuit to a separate output contact member. The wipers are ganged together on a common shaft, and are driven by an electromagnetically actuated ratchet and pawl mechanism. It is characteristic of stepping switches of this type that a wiper can go from one output position to another only by traversing all the steps between them. The most common design provides for advancing from one step to the next in one direction only.

For use in a process control system, stepping switches must have the capability of being reset. In early designs, this was achieved by causing the wiper array to wind up a spring as it stepped. At the end of the step, withdrawal of a detaining pawl from engagement with the ratchet allowed the wiper array to snap back to a fixed starting point, in a direction opposite to the direction of stepping. The currently preferred design is completely unidirectional. Resetting is accomplished by stepping of the array in a forward direction until the wipers again engage the home output contact.

In the preferred form of my invention, the stepping switch has a reciprocating drive mechanism. A driving coil, upon being energized, retracts a driving pawl against a resisting spring through an arc sufficient to allow the pawl to engage the succeeding tooth of a ratchet wheel. The coil is then deenergized and the spring returns the pawl to the original position advancing the wiper a single step. This is called a spring drive system since the wiper advances on the reverse stroke of the reciprocating mechanism.

A direct drive mechanism is also available in which energization of the coil drives the pawl forward advancing the wipers a single step. When the coil is deenergized, the spring returns the pawl to the starting point. This invention is described particularly with reference to a spring drive mechanism, although the direct drive form could equally as well be used. Generally speaking, in both cases, the wipers are driven a single step each time the coil is energized. In the direct drive form the wipers advance on the drive stroke while in the spring drive form, the wipers advance on the reverse stroke of the reciprocating mechanism.

The stepping switches utilized in my invention are also provided with two forms of control contacts, called "interrupt contacts" and "off-normal contacts" respectively. The interrupt contacts designate the position of the driving pawl of the reciprocating mechanism and include a normally open switch and a normally closed switch, designated as such with the pawl at its quiescent position. When the coil of the stepping switch is energized, the pawl moves to immediately open the normally closed contacts and to close the normally open contacts at the end of its stroke.

The off-normal contacts are used to designate the position of the wiper array. A switch driven by a cam affixed to the wiper array completes one circuit when the array is at its home position, and completes another circuit when the array is at any other position.

In the prior art, it has been common practice to connect the driving coil of the stepping switch in series with the interrupt contacts to the power source to cause the device to self-step in the manner of a conventional buzzer or door bell. In such an arrangement, adjustment of the contacts is very critical and frequent readjustment is required. Further, where a large number of wipers are driven by the mechanism, the frictional load introduced by the wipers renders operation of the mechanism uncertain and unreliable. For these reasons, this invention employs a bistable electromagnetic latching relay and its associated circuitry to operate the stepping switch to produce reliability of operation and freedom from maintenance requirements.

My invention utilizes one stepping switch to operate the program contact banks. The program contact banks perform various switching functions within the operating circuit, and also act to open or close the circuit to the controlled devices. Another stepping switch is used in my invention in conjunction with a basic timing device as a time accumulating device. The basic timing device provides a time signal at known basic time intervals. The time is used to operate the time stepping switch so that each contact on its associated contact bank represents a multiple of the basic time interval. Any desired step of the program being controlled can thus be terminated by connecting the program stepping switch to the power source through the appropriate contact on the time bank.

The operation of the two stepping switches is sequential, never simultaneous. The time stepping switch normally rests at a home position. Upon the arrival of the program stepping switch at a time controlled step, the time stepping switch is energized. At the end of the selected time interval, the time stepping switch is returned to its home position prior to the energization of the program stepping switch.

It is also noted that both stepping switches used in my invention are cyclic. That is, both of them must advance through all steps to return to the home or starting position.

Prior art process step controllers having time controlled steps have taken a wide variety of forms. Two of these forms have gained sufficiently wide acceptance to dominate the field. One of these forms employs a series of cascaded timers to provide a selection of time intervals. Such an aggregation of timers is costly and occupies a relatively large amount of space. In such a system, it is further necessary to use hold-in contacts (either incorporated in the timer or embodied in an external relay associated therewith) to keep the timing unit energized during the step that it controls. A serious disadvantage of such a system is that even a momentary power interruption causes all information to be lost as to the point in the process that has been reached. Timers of this kind generally require auxiliary relays to switch power to the controlled devices, adding further to bulk, wiring complexity, and cost.

Perhaps the second most favored form has been that in which a constant rotating drum or disc is used as a program timing device. With this form, the angle of rotation is the analog of elapsed time. Adjustable pins on several tracks of the rotating surface engage fixed switches to define the series of steps in the program. The distance between the pins determines the length of a particular step. A disadvantage of such a device is that if a pin is moved to change the duration of one step, the pins for all succeeding steps must be readjusted to maintain succeeding time intervals unchanged. Again, it is necessary to employ auxiliary relays if more than a very few controlled devices are involved.

It is therefore a primary object of my invention to provide a process step controller, for energizing successive patterns of controlled devices, incorporating adjustable timing means for terminating any of the steps that are to be controlled on an elapsed time basis.

A further object of my invention is to provide a process step controller incorporating optional elapsed time control of the steps, in which the time interval assigned to any step can be changed without altering the time intervals assigned to other steps.

Another object of my invention is to provide a process step controller in which a power failure interrupts the process momentarily, but does not change the sequence of prescribed operations after power is restored.

Another object of my invention is to provide a process step controller in which any predesignated group of steps can be bypassed in response to external command.

A further object of my invention is to provide a process step controller in which a single time responsive mechanism generates different time intervals for control of those steps that are to be terminated on an individually selected elapsed time basis.

Another object of my invention is to provide a time accumulating means energizable at the beginning of a time controlled step by step controller to provide signals at selected multiples of a basic time interval that can be utilized to terminate the time controlled step.

A further object of my invention is to provide timing means for a step controller for terminating a time controlled step after an individually selected time interval wherein the timing means is rapidly cycled to a home position at the termination of a time controlled step before the step controller is energized.

These and other objects of my invention will become apparent when considered in connection with the accompanying specification and drawings, in which:

FIGURE ONE

Figure 1:
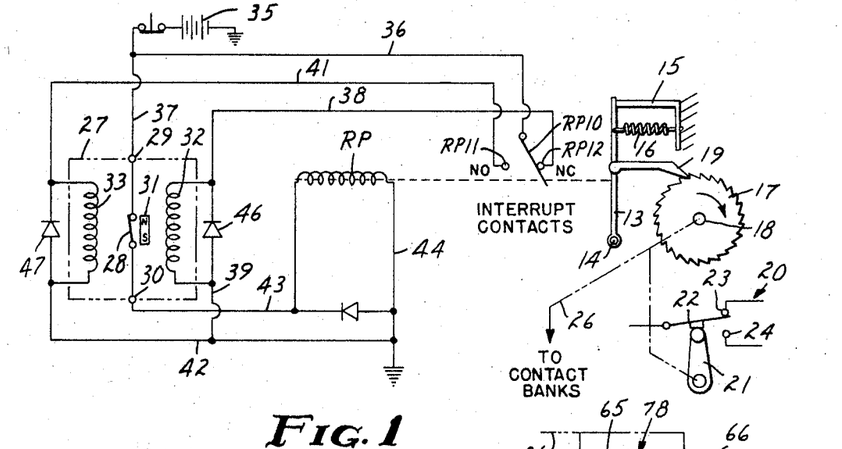
FIG. 1 discloses schematically the basic stepping circuit utilized in my invention.

FIG. 1 discloses the basic stepping circuit that is used in my invention. The circuit includes a program stepping switch having an operating coil RP that operates interrupt contacts (a single-pole double-throw switch) including a movable contact member RP10, a normally open contact RP11 and a normally closed contact RP12. Also operated by operating coil RP is an armature 13 that pivots about a fixed pin 14. The free end of armature 13 abuts a fixed stop member 15 in the normal deenergized position shown in FIG. 1. A coiled spring 16 connected between armature 13 and stop member 15 holds armature 13 in the position shown.

A rotatably mounted ratchet wheel 17 is mounted so as to rotate about its axis 18 in a clockwise direction. A pawl 19 has one end thereof pivotally connected to armature 13 and the other end thereof positioned so as to actuate ratchet wheel 17.

Shown schematically attached to ratchet wheel 17 for rotation therewith is a cam member 21. Cam member 21 operates a single-pole double-throw switch 20 having a movable contact member 22 and fixed contacts 23 and 24. Since cam member 21 rotates along with ratchet wheel 17 movable contact member 22 will be connected to contact 23 at only one position of ratchet wheel 17. This position, the position shown in FIG. 1, is considered the normal or home position of ratchet wheel 17. At all other positions of ratchet wheel 17, cam member 21 will permit movable member 22 to complete a circuit through contact 24, to indicate that ratchet wheel 17 is not in the home position.

Although not shown in FIG. 1, a broken line 26 indicates the presence of one or more contact banks having wipers that are also operated by ratchet wheel 17. The contact banks associated wipers are used to provide useful switching functions.

The basic stepping circuit also includes a first bistable switching device in the form of a latching or operating relay 27 which, in the preferred embodiment, is shown as being of the magnetically-biased sealed reed type. Latching relay 27 includes a single-pole single-throw switch 28 for making or breaking a circuit between a first pair of output terminals 29 and 30. Although switch 28 is shown here as having a single movable member, the actual reed switch normally has a pair of flexible contact members that perform the same function.

Latching relay 27 also includes a biasing magnet 31 that produces sufficient flux in ferromagnetic switch 28 to hold it closed after it is closed by another force, but insufficient flux to close it when it is open. Also included in latching relay 27 between a first pair of input terminals is a latching coil 32 and between a second pair of input terminals is an unlatching coil 33. Latching coil 32 and unlatching coil 33 are shown as separated, but in practice they are wound around the same axis and are closely coupled magnetically.

A source of power 35 is connected by a conductor 36 to a movable member RP10. Power source 35 is also connected to output terminal 29 by a connector 37. Latching coil 32 is connected between contact RP12 and ground by a pair of conductors 38 and 39. Unlatching coil 33 is connected between contact RP11 and ground by a pair of conductors 41 and 42.

OPERATION OF FIGURE ONE

The operation of the basic stepping circuit of FIG. 1 is as follows. When power is applied to the system, latching coil 32 is energized by current flowing through conductor 36, the normally closed interrupt contacts, conductor 38 and conductor 39. The energization of coil 32 causes switch 28 to close, thereby energizing coil RP by means of conductor 37, a conductor 43, and a conductor 44. Coil RP, when energized, actuates the reciprocating mechanism of the stepping switch by magnetically causing armature 13 to pivot in a counter-clockwise direction about pin 14 again the restoring force of spring 16. As armature 13 moves in this direction, pawl 19 drops into the next notch on the edge of ratchet wheel 17. At the same time, the normally closed interrupt contacts are opened to deenergize latching coil 32. Switch 28 does not open immediately, however, because magnet 31 holds it in the closed position. Operating coil RP therefore remains energized. At the end of the stroke, the normally open interrupt contacts are closed so that unlatching coil 33 is energized by means of conductors 36, 41 and 42. The energization of unlatching coil 33 causes switch 28 to open, thereby deenergizing coil RP. With coil RP deenergized, spring 16 draws armature 13 back to the normal position against stop member 15, and movable member RP10 moves back to the normally closed position. Pawl 19 cooperates with the notch in ratchet wheel 17 to move it one step in a clockwise direction. At this point, the cycle will start over again. The circuit as shown will produce continuous stepping as long as power is applied.

Because the circuit to driving coil RP is not broken upon initial separation of the normally closed interrupt contacts (as would be the case in the conventional self-stepping arrangement), but remains closed until the normally open contacts are made, completion of the stroke is assured with a high degree of reliability. A pair of diodes 46 and 47, connected across coils 32 and 33 respectively, further enhance certainty of operation by allowing decay currents to circulate in coils 32 and 33 that delay the reversal of flux to provide additional margin for completion of both the forward and return strokes of the reciprocating mechanism.

In practice, it has been found that this arrangement renders adjustment of the contacts highly uncritical. All that is required is that one set of contacts close during the initial stroke at some point after the other set has opened, and that the reverse is true on the return stroke.

FIGURE TWO

Figure 2:
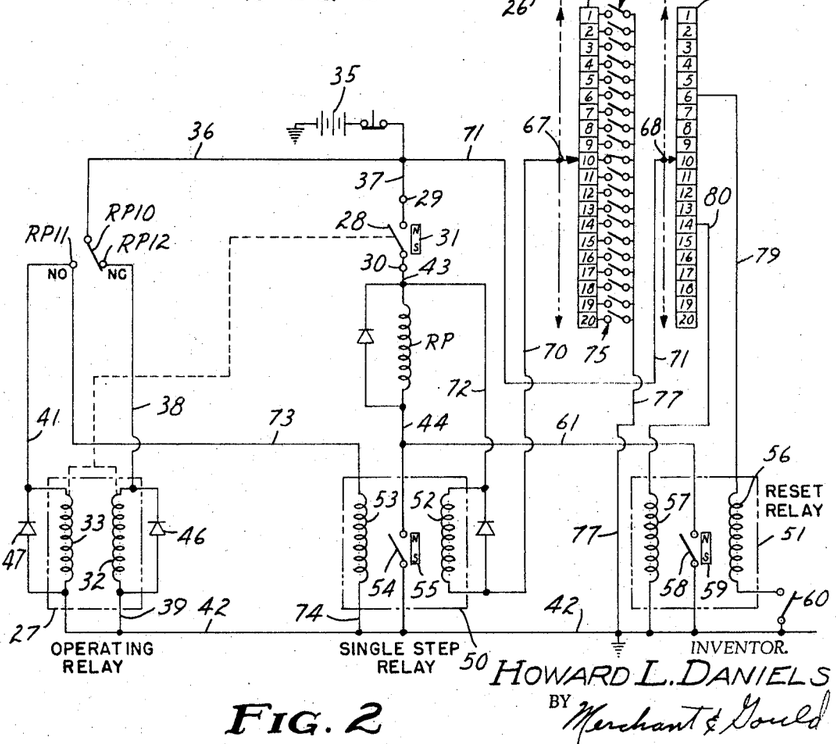
FIG. 2 discloses schematically the basic operating circuit used in my invention.

FIG. 2 discloses a schematic representation of the basic operating circuit of this invention. The circuit of FIG. 2 includes the stepping circuit described in FIG. 1. The numbering of the elements of the stepping circuit of FIG. 1 has been carried forward to FIG. 2 but the locations of the various elements have been rearranged for clarity of representation. Some of the mechanical elements of the basic stepping circuit have been eliminated for the sake of simplicity. It must therefore be remembered that the ratchet and pawl assembly is present even though not specifically shown.

The control or operating circuit of FIG. 2 is evolved from the stepping circuit of FIG. 1 by the addition of two more bistable switching devices (latching relays): a single-step relay 50 and a reset relay 51. Single-step relay 50 includes a latching coil 52 and an unlatching coil 53. The relay coils operate a switch 54 in conjunction with a magnet 55 in the manner previously described for operating relay 27.

The second bistable switching device, reset relay 51, includes a latching coil 56, an unlatching coil 57, a switch 58 and a magnet 59. Latching coil 56 is connected to ground through a single-pole single-throw switch 60.

The lower terminal of stepping switch coil RP is connected by means of conductor 44 to a first stepping mode conductor or bus 61 rather than being connected directly to ground as shown in FIG. 1. Stepping bus 61 can be grounded by closing either switch 54 or switch 58.

Also shown in FIG. 2 is a pair of contact banks 65 and 66. A pair of wiper arms 67 and 68 are operated simultaneously by ratchet wheel 17 as shown schematically by dashed line 26. In actual practice, each of the contact banks 65 and 66 would be arranged in a circle so that the associated wiper 67 or 68 could be rotated to make contact with any selected portion of the bank. The wipers are designed so that they move in one direction only, from top to bottom as shown in the drawings. Upon reaching position 20, they continue rotating in the same direction to return to position 1. For each cycle of operation of stepping switch coil RP, ratchet wheel 17 is moved one position to thereby move wipers 67 and 68 one position.

Wiper 67 is connected to the bottom end of latching coil 52 by a conductor 70. Wiper 68 is connected to power source 35 by a conductor 71. The top end of latching coil 52 is connected to the top or positive end of coil RP by a conductor 72. Unlatching coil 53 is connected between conductors 41 and 42 by means of conductors 73 and 74 respectively.

Returning for a moment to contact bank 65, it is noted that contact bank 65 is connected to a set of accessible output terminals 75. A single output terminal is provided for each of the contact positions in the contact bank. A grounded bus 77 is placed adjacent the output terminals 75 on contact bank 65. A plurality of normally open switches 78 make it possible to connect bus 77 to any of the terminals 75. In FIG. 2 one of the switches 78, the switch at position 10, is shown in the closed position so that position 10 is grounded through conductor 77.

With regard to contact bank 66, the output terminal at position 6 is connected to latching coil 56 by a conductor 79. The output terminal at position 14 is connected to unlatching coil 57 by a conductor 80.

OPERATION OF FIGURE TWO

The operation of the basic controller circuit of FIG. 2 is as follows. When first stepping mode conductor or bus 61 is connected to ground, via second stepping mode conductor 42, the basic stepping switch circuit of FIG. 1 attempts to go into continual stepping operation, at a rate determined by the electrical and mechanical parameters of the stepping switch and operating relay 27. Coil RP energizes and deenergizes as discussed with respect to FIG. 1 to cause rotation of ratchet wheel 17. Wipers 67 and 68 would thus be stepped in a forward direction.

The function of single-step relay 50 is to cause the stepping switch to advance but a single step beyond any given position in response to a given signal. The required given signal is the grounding of one of the terminals 75 on contact bank 65 by closure of one of the switches 78. To initiate the stepping action, the particular terminal 75 at which wiper 67 rests must be grounded. Grounding of any of the other terminals will have no effect since closure of the switch 78 does not complete a circuit unless wiper 67 is present at that position. In this particular example, the switch 78 at position 10 has been closed so that current flows from source 35 through switch 28, conductor 72, latching coil 52, conductor 70 and wiper 67 to energize coil 52 of single-step relay 50. With latching coil 52 energized, switch 54 closes to thereby energize stepping coil RP. The stepping switch attempts to go into continual stepping operation as previously described. However, when movable switch member RP10 completes the circuit to contact RP11, unlatching coil 53 is energized by means of conductors 73 and 74 to open switch 54. Since stepping coil RP cannot become energized with switch 54 open, only a single step is executed with wipers 67 and 68 ending up at position 11. Since the output terminal 75 of position 11 on contact bank 65 is not grounded, the stepping operation stops. It can be seen that as a grounding connection is moved progressively down the array of output terminals 75, wipers 67 and 68 are moved by the stepping switch to remain always one step ahead of the grounded contact.

The positive terminal of latching coil 52 is connected between switch 28 and coil RP to insure that energy is not available to latching coil 52 until the wiper has come to rest in its new position (assuming that new position to be grounded). Any time that the wiper is moving, switch 28 will be open, thereby preventing energization of either coil RP or latching coil 52. If the positive terminal of latching coil 52 were connected directly to power source 35, the result could be (and typically is) that double steps rather than single steps would be executed.

It is a frequent requirement of controllers of this kind that they incorporate the capability of by-passing selected portions of the step sequence (or program) in response to externally supplied indicia. In any given situation, it might be determined that the process being controlled has achieved the desired result and that a certain sequence of steps can be by-passed. The purpose of reset relay 51 is to perform this by-passing function. Let us assume that switch 60 is closed and that wiper 68 is located at position 6 on contact bank 66. Latching coil 56 would then be energized by the current flowing from source 35 through conductor 71, wiper 68, conductor 79 and closed switch 60. With coil 56 energized, switch 58 would close to thereby energize stepping coil RP. The stepping switch would begin its continual stepping operation. Although latching coil 56 would be deenergized as soon as wiper 68 moved to position 7, magnet 59 would hold switch 58 in the closed position to insure continual stepping. The stepping operation would continue until wiper 68 arrived at position 14. At this position current would be supplied to unlatching coil 57 through the wiper and conductor 80 to open switch 58. Wiper 68 would stop at position 14 since coil RP would be once again isolated from ground. Although only one reset relay has been shown in connection with FIG. 2, it is clear that any number of such relays might be incorporated in the system to by-pass other sections of the program in response to contact closures similar to the closure of switch 60.

FIGURE THREE

Figure 3:
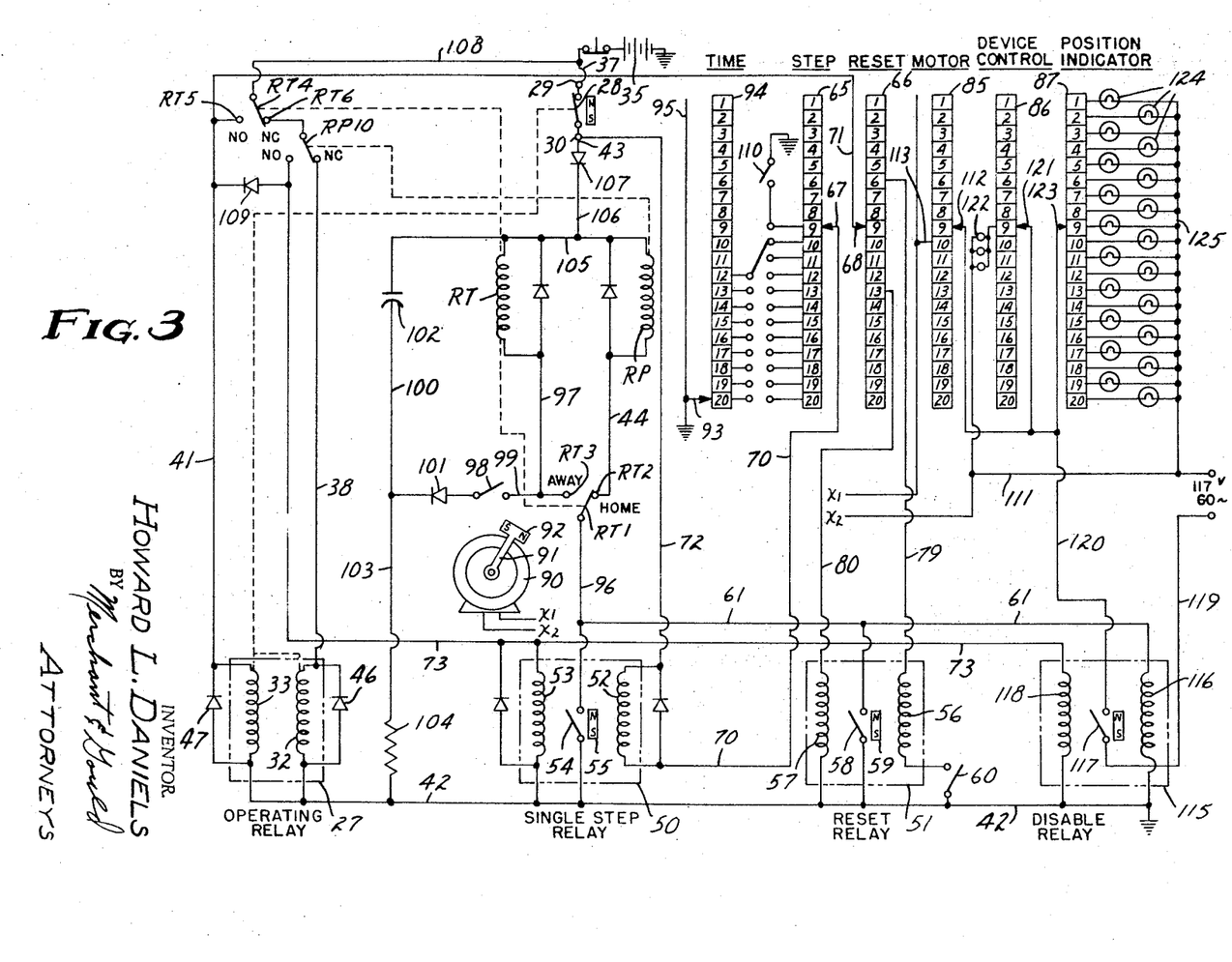
FIG. 3 discloses schematically the process step controller of my invention.

FIG. 3 discloses a process step controller for sequentially actuating a series of controlled devices. This circuit is a modification of the controller operating circuit of FIG. 2 and provides means for terminating one or more of the process steps on the basis of elapsed time. Each of the contact banks shown in FIG. 3 provides 20 separate output contacts that can be connected into a circuit by the associated wiper. Each of the twenty contacts on the program contact banks can be used to control a separate step in the process being controlled. Each step in the process may require the actuation of one or more controlled devices.

The basic stepping circuit of FIG. 1 and the basic controller operating circuit of FIG. 2 have been included in the step controller of FIG. 3. Some modifications of the circuits have been made, however, and additional circuitry has been added. In FIG. 2, only two contact banks, a step bank 65 and a reset bank 66, were associated with a program stepping switch coil RP. In FIG. 3, however, three additional contact banks have been added. These include a motor-control bank 85, a device-control bank 86 and an indicator-control bank 87. The wipers associated with these banks are driven by coil RP through ratchet wheel 17 as shown in FIG. 1. The wipers associated with banks 65, 66, 85, 86, and 87 all move in unison so that the same contact on each bank is being wiped at the same time.

Stepping switch contacts are not well adapted to withstand the arcing that occurs in switching currents of significant magnitude. Power is therefore supplied to contact banks 85, 86, and 87 through a third bistable switching device, a disable relay 115. Disable relay 115 includes a latching coil 116, a switch 117, and an unlatching coil 118. Latching coil 116 is connected directly between stepping bus 61 and ground. Unlatching coil 118 is connected to conductor 73 and to ground. One side of switch 117 is connected to the 117 volt power source by means of a conductor 119. The other side of switch 117 is connected by means of a conductor 120 to wipers 112, 121, and 123 associated with contact banks 85, 86, and 87.

As previously mentioned, one of the contact banks associated with the program stepping switch (RP) is position indicator bank 87. Associated with indicator bank 87 is wiper 123 that is connected to conductor 120. Connected to each of the contact positions on bank 87 is a light or other indicator device such as 124. Each of the indicator devices 124 is also connected to a conductor 125 that leads to the 117 volt power source.

The most important modification included in FIG. 3 is the addition of the time control capability. The timing circuit includes a timing motor 90 that may be a synchronous motor of the type generally used in electric clocks. Attached to the output shaft of motor 90 is a crank arm 91 having a permanent magnet 92 attached to the end thereof. Also new in the circuit of FIG. 3 is a time stepping switch coil RT that is part of a stepping switch similar to that disclosed in FIG. 1. Again, the ratchet wheel and other mechanical components associated with coil RT are not shown. When coil RT is cycled, the associated ratchet wheel drives a wiper 93 across an associated contact bank 94. Wiper 93 is connected to ground by a conductor 95.

Also operated by coil RT is a single pole double throw switch having a movable contact member RT1, a home contact RT2, and an away contact RT3. These "off normal" contacts operate in the manner described in FIG. 1 with regard to a similar switch 20 associated with ratchet wheel 17. Movable contact member RT1 is in the home position when wiper arm 93 is located at home position 20 on time bank 94. At all other positions of wiper 93, movable member RT1 is in the away position adjacent contact RT3. Movable member RT1 is connected to stepping bus 61 and switch 54 by conductor 96. Home contact RT2 is connected to coil RP by conductor 44. Away contact RT3 is connected to the bottom of coil RT by a conductor 97 and to a normally open single pole single throw switch 98 by a conductor 99. Switch 98 is connected to the top end of coil RT by a conductor 100 in which is located a diode 101 and a capacitor 102. Conductor 100 is connected to ground between diode 101 and capacitor 102 by a conductor 103 in which is connected a resistor 104.

Coils RT and RP are connected together at the top or positive end by a conductor 105. Conductor 105 is connected to switch 28 by conductor 43 and a conductor 106. A diode 107 is connected in conductor 106 so as to block current flowing from conductor 105 toward switch 28.

A single pole double throw interrupt switch is also operated by coil RT. This switch includes a movable member RT4, a normally open contact RT5, and a normally closed contact RT6. This set of interrupt contacts is used to continually step coil RT in the same manner as that described with regard to FIG. 1 and coil RP. Movable member RT4 is connected to power source 35 by a conductor 108, normally closed contact RT6 is connected to movable member RP10, and normally open contact RT5 is connected to conductor 41. Normally open contact RT5 is also connected by means of conductor 71 to wiper 68 on reset bank 66. A diode 109 is connected between the conductors 41 and 73 to block current flowing from conductor 41 toward conductor 73.

The operation of the time stepping switch including operating coil RT and time bank 94 is as follows. With switch 98 open, capacitor 102 is gradually charged to capacity through resistor 104. The value of resistor 104 is too high to allow the energization of coil RT when switch 98 is closed, but it is low enough to allow a full charge to be restored to capacitor 102 when contact 98 is open. Switch 98 is closed each time magnet 92 passes the switch. Switch 98 comprises a normally open magnetic reed switch that closes momentarily when magnet 92 reaches the closest position at the top of its travel. As soon as magnet 92 passes by this top position, switch 98 again opens. When switch 98 closes, capacitor 102 discharges to energize coil RT. Thus, coil RT is energized each time magnet 92 closes switch 98. Motor 90 receives power through contact bank 85 and conductors X1 and X2. The wiper on contact bank 85 is driven by coil RP. The connections between bank 85 and conductor X1 are such that motor 90 receives power only during those steps which are to be controlled by time. Motor 90 is inoperative during those steps that are controlled by other parameters. Once motor 90 is energized, it will run at a known speed to produce stepping of the time stepping switch (RT) at known intervals.

The time stepping switch (RT) is stepped by a discharge of capacitor 102 into coil RT each time contact 98 closes, at the time of initial closure. It should be noted here that the period of rotation of the motor is assumed to be long relative to any action involving stepping of the basic stepping switches. Typically, the rotation period (or basic increment of time resolution) has been on the order of two minutes, whereas a single step of either stepping switch is completed in less than forty milliseconds, and a complete cycle for a twenty position switch requires less than a second. Switch 98 is closed during only a small fraction of the cycle, and capacitor 102 charges through resistor 104 during the major portion of the cycle. Typical values which have been used are: C=4500µf., R=1000 ohms, RT resistance=20 ohms.

An alternate means for periodically stepping coil RT has been used in which switch 98 discharges a very small capacitor to latch a latching relay. The contacts of the latching relay complete the circuit to coil RT and the unlatching coil is energized by the interrupt contacts of RT on completion of the initial stroke, so that a single step of RT results. This alternate circuit is not shown in the accompanying drawing, however.

Before discussing the operation of the process step controller of FIG. 3, it should be noted that the circuit is designed to control a process having a series of discrete steps, some of which must be terminated on an elapsed time basis, and others of which are terminated by other criteria (pressure, temperature, liquid level, volume of flow, etc.). The control system must actuate the controlled device or devices at the beginning of each step. The step is then terminated either on an elapsed time basis or by some other selected method. Where the elapsed time basis is used to terminate a step, the system must also provide means for changing the time dependent upon the particular step involved.

OPERATION OF FIGURE THREE

The operation of the step controller of FIG. 3 is as follows. Begin with the assumption that all of the switches are in the position shown in FIG. 3. All of the wipers of the program stepping switch (RP) are located at position 9 of the contact banks. Wiper 93 of the time stepping switch (RT) is located at home position 20. Let us assume that the step being performed at position 9 has been completed and that it is desired to move to position 10. At this point, a switch 110 (a second switching means) is closed to connect the output terminal at position 9 on step bank 65 to ground. Current then flows from source 35 through a second circuit including switch 28, conductor 72, latching coil 52, and conductor 70 to energize latching coil 52. Switch 54 of single step relay 50 (a first switching means) closes to thereby energize coil RP through a first circuit (since the time stepping switch (RT) is at its home position (20), movable contact RT1 is at the home position to connect switch 54 to coil RP). When coil RP energizes, movable member RP10 moves to the normally open position so that current flows through diode 109, conductor 41, and unlatching coil 33 to energize coil 33. Energization of coil 33 causes switch 28 to open thereby deenergizing coil RP. At the same time, current flows through movable member RP10 and conductor 73 to energize unlatching coil 53 of single step relay 50. With coil 53 energized, switch 54 opens so that coil RP cannot again energize. The program stepping switch thus moves a single step to place the wipers all at position 10.

Position 10 is a time controlled step. Power is thus supplied to synchronous motor 90 via the following route: from the bottom terminal of the 117 volt source through a conductor 119, a switch 117, a conductor 120, a wiper 112, contact 10 of motor bank 85, a conductor 113, conductor X1, the motor, conductor X2 and conductor 111 back to the top terminal of the source. If we assume that motor 90 requires two minutes for a complete rotation, magnet 92 will pass beneath switch 98 two minutes after the wipers reach position 10. At this time, with switch 98 closed, capacitor 102 discharges to energize coil RT, thereby moving wiper 93 from position 20 to position 1 on time bank 94. Every two minutes, the cycle will repeat and wiper 93 will be moved one step further.

After twenty-four minutes, position or step 12 is reached by wiper 93. The output terminal of position 12 on time bank 94 is connected to the output terminal on position 10 of step bank 65. With wiper 67 now at position 10 and wiper 93 at position 12, wiper 67 will be grounded through wiper 93 to again energize latching coil 52 of single step relay 50. Normally this would cause the energization of coil RP to move the program stepping switch wipers to position 11. In this case, however, coil RP has been disconnected from ground since movable contact member RT1 is now in the away position adjacent contact RT3. Instead of coil RP being energized therefore, coil RT is energized. The time controlled stepping switch (RT) now goes into continual stepping operation to return wiper 93 to home position 20. When home position 20 is reached, movable member RT1 switches to its home position adjacent contact RT2, at which point coil RP is energized through the closed contacts 54 and 28 to advance the program wipers a single step to position 11.

The continual stepping operation of the time controlled stepping switch (RT) is accomplished in the same manner as described for stepping switch (RP) in Fig. 1. For continual stepping operation, coil RT is energized through switch 54 and switch 28. The energization of coil RT causes movable member RT4 to go to the normally open position adjacent contact RT5. Unlatching coil 33 of operating relay 27 is thus energized to open switch 28. With switch 28 open, coil RT deenergizes returning movable member RT4 to the normally closed position. At this normally closed position, latching coil 32 is energized to again close switch 28. With switch 28 closed, coil RT is energized to repeat the cycle. This continual stepping operation continues until the time controlled stepping switch (RT) reaches home position 20, at which time the "off normal" switch (RT1) moves to the home position to disconnect coil RT from ground.

As previously stated, the stepping switch contacts are not well adapted to withstand arcing, therefore power is supplied to device control bank 86, motor control banks 85 and position indicator bank 87 through disable relay 115. Under normal conditions, current flows through coil RP and through coil 116 of disable relay 115 since they are connected in series. The resistances of the two coils are such that coil RP is not energized by this small amount of current, while coil 116 is energized. With latching coil 116 energized, switch 117 is closed to supply line voltage through conductors 119 and 120 to wipers 112, 121, and 123. A plurality of controlled devices 122 would thus be energized with wiper 121 at position 9. Although only a single group of controlled devices 122 is shown connected to device control bank 86, it is obvious that either a single controlled device or a group of controlled devices would be connected to each output contact in bank 86 that represented a step in the program being controlled. Under normal quiescent conditions, as far as the stepping switches are concerned, power to controlled devices such as 122 is thus provided through switch 117 and wiper 121. However, when action of the stepping switch is desired, it is deemed desirable to disconnect the wipers from the source of power so that no arcing occurs during the switching operation. This function is accomplished as follows. When stepping bus 61 is connected to ground, either by single step relay 50 or reset relay 51, latching coil 116 is shorted and is therefore deenergized. As soon as coil RP energizes, movable member RP10 moves to the normally open contact to provide power via conductor 73 to unlatching coil 118 of disable relay 115. Unlatching coil 118 energizes to open switch 117. Power is thus removed from wipers 112, 121, and 123. Switch 117 opens before any motion is imparted to the wiper banks and does not close until the connection from the stepping bus 61 and ground has been opened near the completion of the driving stroke. It is thus evident that switch 117 remains open throughout a reset operation, thus preventing momentary action of all controlled devices, including motor 90, as the wipers step through successive positions.

With regard to position indicator bank 87, its operation is as follows. Since power is supplied to wiper 123 through switch 117 of disable relay 115, one of the indicator devices 124 is energized each time wiper 123 comes to rest. If each of the indicator devices 124 is a light source, the position of wiper 123 and the other associated wipers of the program stepping switch (RP) is clearly indicated. Certain positions can also actuate audible alarms, in the event that a dwell at a designated position signifies inability of the process to continue. Such audible alarm devices are frequently used when a dwell step is provided calling for manual intervention before the process proceeds. Various other types of position indicating devices or signal generators may be utilized as desired.

The reset relay circuit of FIG. 3 has been modified as compared to that disclosed in Fig. 2 in that voltage can be applied to latching coil 56 only when stepping switch (RT) is in the process of stepping. Conductor 71 is connected to the normally open contact RT5 so that source 35 is connected to wiper 68 only when coil RT is energized. Thus, the state of switch 60 is sampled periodically rather than being monitored continuously.

The operation of the reset relay section is as follows. Assume that switch 60 is closed and that wiper 68 has moved from position 5 to position 6. Further assume that the sysem is wired such that motor 90 is energized at position 6. When magnet 92 closes switch 98, coil RT energizes thereby moving member RT4 to a position in contact with contact RT5. Source 35 is then thus connected to wiper 68 via conductor 71. Latching coil 56 is thus energized via conductor 79. With coil 56 energized, switch 58 closes and is held closed by magnet 59 to begin the stepping operation. When wiper 68 reaches position 13, power is supplied to unlatching coil 57 via conductor 71, movable member RP10 and the associated normally open contact. With unlatching coil 57 energized, switch 58 opens so that coil RP cannot again energize. Since the energization of coil RP is required to also energize coil 57, wiper 68 comes to rest at position 14. The advantage derived from this system is that the time motor shaft always comes to rest at the same point since power to the motor is cut off as soon as the wipers move to the next position upon the closing of switch 98. Because of this, the next cycle starts with a full time increment.

The same result could be achieved by supplying voltage to reset bank 66 continuously, resetting to the position ahead of the desired position, and then making that position a time controlled step of minimum duration. Power would not have to be supplied to any controlled device during this step of minimum duration, the sole purpose of which would be to re-zero the time motor.

Some other features of the invention might be mentioned at this point. Diode 109 performs an essential function in preventing the energization of unlatching coil 53 via the interrupt contacts RT, while at the same time allowing the interrupt contacts of either RT or RP to energize unlatching coil 33 of operating relay 27. The purpose of diode 101 is to prevent capacitor 102 from shorting coil RT when the coil is being stepped by operating relay 27. Diode 107 blocks the flow of current from capacitor 102 to latching coil 32 of operating relay 27 to prevent double stepping as described in connection with FIG. 2.

To facilitate readjustment of time intervals, it is desirable to bring the contacts of time bank 94 and step bank 65 out to accessible screw terminal strips as shown. Any terminal of step bank 65 can then be connected to any terminal of time bank 94 to terminate the step on bank 65 after a time interval equal to the number of basic time increments represented by the number of the contact to which it is connected on time bank 94. Alternatively, any contact of step bank 65 may be grounded by means other than through time bank 94. Thus, a manual switch or other switch closure may be utilized to ground a particular contact of step bank 65 to initiate operation of stepping switch RP. It is also possible to terminate a step by connecting the contact on step bank 65 to both time bank 94 and to an external switch so that stepping is initiated by whichever first grounds the contact of step bank 65.

In general, operation of the program stepping switch (RP) is initiated by connecting to ground the contact on which wiper 67 rests. This can be done in a number of different ways as previously described. If wiper 93 on time bank 94 is at home position 20, coil RP will immediately be energized to move the wipers a single step. The single step is regulated by single step relay 50 as previously described. If, however, the time stepping switch (RT) is not at home position 20, grounding of the contact on step bank 65 will cause energization of coil RT instead of coil RP since member RT1 is at the away position rather than at the home position. The time stepping switch (RT) then steps until it reaches home position 20, at which time member RT1 moves to its home position adjacent contact RT2. At this time, coil RP is energized to initiate the single program step desired. It therefore should be noted that the program stepping switch (RP) can respond to a command only after the time stepping switch (RT) has returned to the home or starting position 20.

If the position at which the program wipers come to rest is a time controlled position, motor 90 is connected to the 117 volt power source via motor bank 85. At the same time, a device may be controlled through bank 86 and the position of the wipers is shown by an indicator 124 associated with bank 87. If the wiper comes to rest at a position from which it is desired to reset the system, switch 60 is closed and motor 90 is energized so that reset relay 51 causes the system to reset after the first time increment is completed.

A salient feature of the components of this control system and their inter-relationship is that no information is lost as to the point in the cycle in the event of power faliure. When power is restored, the process continues in exactly the prescribed order from the point at which it was interrupted.

It is noted that switch 98 is of the sealed reed type. Magnet 92 and switch 98 are thus equivalent to cam actuated contacts. They are to be preferred, however, since the sealed reed switch is not subject to the effects of dirt and corrosion, is essentially free from contact bounce when contact is made, and has an intrinsic snap action characteristic on opening.

Various modifications to my invention may occur to those skilled in the art. For example, the latching relays might be replaced by other types of bistable switching devices. Transistor flip-flops, driving power transistors, or gated silicon controlled rectifiers might be employed to perform the switching function. At the present state of the art, costs would not favor these alternatives. Of more importance, even momentary power failure would destroy the memory of the previous state of the flip-flops.

Similarly, both stepping switches might be replaced by transistor ring counters, driving transistors, or gated SCR's to perform the various switching functions. The same considerations apply, however, and such modifications would be considered only if the speeds of operation required were in excess of the capabilities of available stepping switches.

With regard to basic logic, a possible modification would be to use the time stepping switch in the manner of a preset counter. At the start of a time controlled step, RT would step forward to a position such that the steps remaining in a complete cycle correspond to the desired time interval. Subsequent stepping would then proceed under control of the time motor until home position is reached, at which point the program stepping switch (RP) is stepped to the succeeding position.

The function of the time accumulating stepping switch can be generalized without departing from the invention. The count accumulating device is basically responsive to a train of impulses, signals or contact closures of a sequential nature. These signals, although shown to be equally spaced in time in the preferred embodiment, are not necessarily so spaced. Of course, if the steps are terminated on an elapsed time basis, the basic timing or signal means will normally generate an impulse at a preselected basic time interval. In many situations, however, time is not the basis on which the steps are terminated. In such cases, the timing motor and associated contacts would be replaced by apparatus responding to whatever variable is being used to terminate the step. Variables such as flow, shaft rotation, or temperature change could be utilized to operate signal means for generating an impulse upon the occurrence of the basic event. The count accumulating stepping switch than operates in response to the impulse to provide a plurality of output signals each of which represents a predetermined count of sequential occurrences of the basic event.

These and other variations, which may be effected by those skilled in the art, are considered to be within the scope of the invention. I therefore intend to be limited only by the scope of the appended claims.

I claim:

1. A step controller for sequentially activating a series of preselected groups of an array of controlled devices, each group representing a single step of a program, comprising:
    (a) A cyclic program stepping switch having a first operating coil and a plurality of program contract banks;
    (b) A wiper associated with each of said contact banks and operated by said coil, said contact banks each having a plurality of output contacts that are sequentially selected by said associated wiper in response to the repeated energization of said coil, each of said output contacts representing a step in said program and in conjunction with said associated wiper being adapted to control activation of selected controlled devices connected thereto;
    (c) a first circuit including a first switching means that when actuated connects said first operating coil in series with a source of electrical energy to energize said coil, said coil advancing said wipers a single step each time it is energized and deenergized;
    (d) a second circuit connecting a second switching means, any selected program output contact of a first of said program contact banks, a first associated wiper, and means for actuating said first switching means in series with a source of electrical energy whereby upon the closing of said second switching means and the arrival of said associated wiper at said selcted program output contact said first switching means is actuated to thereby terminate the program step represented by said selected output contact; and
    (e) timing means for operating said second switching means, said timing means including a timing motor energizable through a second of said program contact banks and its associated wiper, said motor being energized at the beginning of a time controlled step, being operative to close said second switching means at the end of a predetermined time interval to advance said wipers a single step, and being deenergized at the end of each time controlled step.

2. The apparatus of claim 1 wherin:
    (a) said second switching means comprises the combination of selected time output contact and a time controlled wiper that is operated by a second operating coil of a time controlled stepping switch, said time stepping switch having a time contact bank with a plurality of said time output contacts that are sequentially selected by said associated wiper, said time controlled wiper moving a single step each time said second operating coil is energized;
    (b) said normally deenergized timing means is energized through said second program contact bank at the beginning of each time controlled program step; and
    (c) means operated by said timing means are provided for energizing said second operating coil at predetermined intervals of time after said timing means is energized.

3. The apparatus of claim 1 having means for terminating any of said program steps on an elapsed time basis, comprising:
    (a) a time accumulating stepping switch having a time contact bank with a plurality of output contacts thereon that are sequentially selected by a wiper operated by said time stepping switch, said wiper having a normal home position on one of said output contacts and a plurality of away positions on said remaining output contacts through all of which said wiper moves to return to said home position;
    (b) said timing means generating a series of electrical impulses at preselected time intervals;
    (c) circuit means including said second program contact bank and its associated wiper for initiating said timing means at the beginning of a time controlled program step;
    (d) means connecting said timing means to said time stepping switch so that said associated wiper is advanced a single step each time one of said electrical impulses is generated, each of said away positions thereby representing a known summation of said successive preselected time intervals;
    (e) said second switching means comprising a selected one of said away position contacts and its associated wiper; and
    (f) means for returning said time stepping switch wiper to said home position after the closing of said second switching means during a time controlled program step and prior to the termination of said time controlled program step.

4. The apparatus of claim 3 wherein said means for returning said time stepping switch wiper to said home position after the closing of said second switching means during a time controlled program step and prior to the termination of said time controlled program step, comprises:
    (a) said time stepping switch having a second operating coil;
    (b) a normally closed switch and a normally open switch operated by said second operating coil;
    (c) a first bistable switching device providing either a closed circuit condition or an open circuit condition between a first pair of output terminals in response to an electrical signal applied to first and second pairs of input terminals respectively;
    (d) circuit means interconnecting said normally closed switch, said first pair of input terminals and said source;
    (e) circuit means interconnecting said normally open switch, said second pair of input terminals and said source;
    (f) means connecting said output terminals in series with said first circuit;
    (g) a set of off-normal contacts operated by said second operating coil;
    (h) means including said off-normal contacts connecting said second operating coil in said first circuit with said time controlled wiper in an away position; and
    (i) means including said off-normal contacts for disconnecting said first operating coil from said first circuit with said time controlled wiper in an away position and for connecting said first operating coil in said first circuit with said time controlled wiper in said home position.

5. The apparatus of claim 12 having reset means for bypassing a series of steps on said programs, comprising:
 (a) a program contact bank;
 (b) circuit means connecting the wiper associated with said program contact bank to said source;
 (c) a second bistable switching device providing either a closed circuit condition or an open circuit condition between a second pair of output terminals in response to an electrical signal applied to third and fourth pairs of input terminals respectively;
 (d) circuit means connecting said third pair of input terminals between said source and the output contact on said contact bank that represents the first program step to be bypassed;
 (e) circuit means connecting said fourth pair of input terminals to said source through contacts actuated by said program stepping switch when said switch reaches a position that represents the last program step to be bypassed; and
 (f) means connecting said second pair of output terminals in parallel with said first switching means in said first circuit.

6. Apparatus for rapidly cycling a program control system through a step sequence, comprising:
 (a) a cyclic stepping switch including:
  (1) an operating coil;
  (2) a reciprocating output mechanism operated by said coil and having a normal first position with said coil deenergized and an actuated second position with said coil energized;
  (3) a normally closed switch operated by said coil that closes upon said output mechanism reaching said first position;
  (4) a normally open switch operated by said coil that closes upon said output mechanism reaching said second position; and
 (b) an operating circuit for said stepping switch including:
  (1) a first bistable switching device providing either a closed circuit condition or an open circuit condition between a first pair of output terminals in response to an electrical signal applied to first and second pairs of input terminals respectively;
  (2) a source of electrical energy;
  (3) circuit means interconnecting said coil, said output terminals, and said source;
  (4) circuit means interconnecting said normally closed switch, said first pair of input terminals and said source; and
  (5) circuit means connecting said normally open switch and said second pair of input terminals in series with said source, said stepping circuit thereby providing continual reciprocation of said output mechanism.

7. The apparatus of claim 6 wherein said bistable switching device is an electromagnetic latching relay.

8. An operating circuit for a cyclic program stepping switch comprising:
 (a) a program stepping switch having:
  (1) an operating coil,
  (2) a reciprocating mechanism operated by said coil having a driving stroke and a reverse stroke,
  (3) a normally open switch operated by said coil that closes at the end of said driving stroke,
  (4) a normally closed switch operated by said coil that closes at the end of said reverse stroke;
 (b) a first bistable switching device providing a closed circuit condition between a first pair of output terminals in response to an electrical signal applied to a first pair of input terminals, and an open circuit condition between said output terminals in response to an electrical signal applied to a second pair of input terminals;
 (c) a source of electrical energy;
 (d) first and second stepping mode conductors;
 (e) circuit means interconnecting said normally closed switch, said first pair of input terminals, said second stepping mode conductor and said source;
 (f) circuit means interconnecting said normally open switch, said second pair of input terminals, said second stepping mode conductor and said source;
 (g) circuit means connecting said coil and said output terminals in series between said source and said first stepping mode conductor; and
 (h) means for shorting said first and second stepping mode conductors to cause continual stepping action as long as said stepping mode conductors are shorted.

9. The apparatus of claim 8 wherein single step means are provided for shorting said first and second stepping mode conductors, comprising:
 (a) a bistable switching device providing either a closed or an open circuit condition between a pair of output terminals in response to the energization of a pair of latching terminals or a pair of unlatching terminals respectively;
 (b) means connecting said output terminals between said stepping mode conductors;
 (c) a first wiper operated by means including said reciprocating mechanism;
 (d) a first array of output contacts selected sequentially by said first wiper during operation of said reciprocating mechanism;
 (e) means including said first wiper and one of said array of output contacts for energizing said pair of latching terminals; and
 (f) means interconnecting said pair of unlatching terminals, said normally open switch and said source so that the closing of said normally open switch causes the energization of said unlatching terminals to limit the operation of said stepping switch to a single step.

10. The apparatus of claim 8 wherein reset means are provided to bypass selected portions of said program, comprising:
 (a) an array of output contacts selected sequentially by a wiper operated by said reciprocating mechanism;
 (b) second bistable switching device providing either a closed or an open circuit condition between a second pair of output terminals in response to the energization of a pair of latching terminals or a pair of unlatching terminals respectively;
 (c) means connecting said second pair of output terminals between said stepping mode conductors;
 (d) means including said wiper and a selected output contact on said array for energizing said latching terminals to begin bypassing said selected portions; and
 (e) means for energizing said unlatching terminals to terminate said bypassing.

11. A step controller for sequentially activating a series of preselected groups of an array of controlled devices, each group representing a single step of a program comprising:
 (a) A cyclic program stepping switch having a first operating coil and a plurality of program contact banks;
 (b) a wiper associated with each of said contact banks and operated by said coil, said contact banks each having a plurality of output contacts that are sequentially selected by said associated wiper in response to the repeated energization of said coil, each of said output contacts representing a step in said program and in conjunction with said associated wiper being adapted to control activation of selected controlled devices connected thereto;
 (c) a first circuit including a first switching means that when actuated connects said first operating coil in series with a source of electrical energy to energize said coil, said coil advancing said wipers a single step each time it is energized and deenergized;

(d) a second circuit connecting a second switching means, any selected program output contact of a first of said program contact banks, a first associated wiper, and means for actuating said first switching means in series with a source of electrical energy whereby upon the closing of said second switching means and the arrival of said associated wiper at said selected program output contact said first switching means is actuated to thereby terminate the program step represented by said selected output contact; and (e) means to rapidly step said program stepping switch through a plurality of steps, comprising:
  (1) a normally closed switch and a normally open switch operated by said first operating coil;
  (2) a first bistable switching device providing either a closed circuit condition or an open circuit condition between a first pair of output terminals in response to an electrical signal applied to first and second pairs of input terminals respectively;
  (3) circuit means connecting said normally closed switch and said first pair of input terminals in series with said source;
  (4) circuit means interconnecting said normally open switch, said second pair of input terminals and said source;
  (5) said first circuit having said first pair of output terminals interconnected therewith; and
  (6) means for latching said first switching means in actuated condition upon the initial actuation thereof.

12. The apparatus of claim 11 wherein means are provided to limit operation of said program stepping switch to a single step, comprising means including a circuit connected through said normally open swtich to said source for unlatching said first switching means upon the energization of said first operating coil.

13. A step controller for sequentially activating a series of preselected groups of an array of controlled devices, each group representing a single step of a program, comprising:

(a) a cyclic program stepping switch having a first operating coil and a plurality of program contact banks;

(b) a wiper associated with each of said contact banks and operated by said coil, said contact banks each having a plurality of output contacts that are sequentially selected by said associated wiper in response to the repeated energization of said coil, each of said output contacts representing a step in said program and in conjunction with said associated wiper being adapted to control activation of selected controlled devices connected thereto;

(c) a first circuit including a first switching means that when actuated connects said first operating coil in series with a source of electrical energy to energize said coil, said coil advancing said wipers a single step each time it is energized and deenergized;

(d) a second circuit connecting a second switching means, any selected program output contact of a first of said program contact banks, a first associated wiper, and means for actuating said first switching means in series with a source of electrical energy whereby upon the closing of said second switching means and the arrival of said associated wiper at said selected program output contact said first switching means is actuated to thereby terminate the program step represented by said selected output contact; and (e) disable means to disconnect said controlled devices from their source of energization during a stepping operation, comprising:
  (1) at least one of said program contact banks used for device control and having an associated device control wiper operated by said first operating coil;
  (2) a third bistable switching device providing either a closed or an open circuit condition between a third pair of output terminals in response to an electrical signal applied to fifth and sixth pairs of input terminals respectively;
  (3) circuit means connecting said third pair of output terminals between said device control wiper and a source of power for said controlled devices;
  (4) means connecting said fifth pair of input terminals in parallel with said first switching means so that said third pair of output terminals are normally in said closed circuit condition;
  (5) a normally open switch operated by said first operating coil;
  (6) means connecting said sixth pair of input terminals across said source through said normally open switch so that the energization of said first operating coil opens the circuit between said third pair of output terminals; and
  (7) means connecting said controlled devices in each group between said source and an output contact on said device control program bank.

14. Apparatus for sequentially energizing a number of discrete patterns of an array of controlled devices, each of said discrete patterns representing a step in said process, including means for terminating one or more of said steps on an individually selected predetermined count basis, comprising:

(a) a step controller including driving means that when energized will advance said step controller a single step, said step controller being a cyclic program stepping switch having a plurality of program contact banks, each of said banks having a plurality of output contacts that are sequentially actuated upon the repeated energization of said driving means;

(b) signal means for generating an impulse upon the occurrence of a basic event;

(c) count accumulating means operable in response to said impulse to provide a plurality of sequential output signals each representing a predetermined count of sequential occurrences of said basic event, said count accumulating means comprising a cyclic switch having a contact bank, said contact bank having a plurality of output contacts through which said output signals are sequentially provided;

(d) means including one of said program contact banks for making said count accumulating means responsive to said signal means; and (e) means including one of said program contact banks to provide a selected output signal from said count accumulating means for energizing said driving means to terminate said count controlled step.

15. The apparatus of claim 14 in which said signal means comprises a timing means for generating a time impulse at basic time intervals upon the actuation thereof, and in which said count accumulating means provides a plurality of output signals each representing a predetermined multiple of said basic time interval, whereby a selected output signal energizes said driving means to terminate a selected time controlled step at the end of a predetermined count of time intervals.

16. Apparatus for sequentially energizing a number of discrete patterns of an array of controlled devices each of said discrete patterns representing a step in said process, including means for terminating one or more of said steps on an individually selected predetermined count basis, comprising:

(a) a step controller having a first cyclic program stepping switch and a plurality of program contact banks, each of said banks having a plurality of output contacts representing a single step and being sequentially actuated upon the repeated energization of a driving means for said step controller;

(b) driving means for said step controller that when energized will advance said step controller a single step;

(c) signal means for generating an impulse upon the occurrence of a basic event;

(d) count accumulating means operable in response to said impulse to provide a plurality of sequential output signals each representing a predetermined count of sequential occurrences of said basic event, said count accumulating means comprising a second cyclic stepping switch having a contact bank, said count accumulating means having a home position representing a zero count condition, and a plurality of away positions in which said output signals are sequentially provided, the total of said away positions representing a maximum count which may be accumulated;

(e) means including one of said program contact banks for actuating said signal means at the beginning of a count controlled step and for deactuating said signal means at the termination of said step;

(f) means including one of said program contact banks for cycling said second cyclic stepping switch sequentially through all away positions other than a sequence thereof representing a count preselected to terminate the count controlled step to return said count accumulating means to said home position; and (g) means including said count accumulating means in said home position and one of said program contact banks for energizing said driving means to terminate said count controlled step.

17. In a step controller having first stepping means and a plurality of program contact banks, at least one of said program contact banks being adapted to sequentially energize a number of discrete patterns of an array of control devices, each of said discrete patterns representing a single step; means for terminating one or more of said steps on an individually selected predetermined count basis, comprising:

(a) signal means for generating a train of impulses corresponding to the repeated occurrence of a basic event;

(b) a count accumulating means having second stepping means and a contact bank with a plurality of sequentially operable output contacts thereon, said count accumulating means having operating means operable in response to said train of impulses to operate said second stepping means a single step for each impulse, said output contacts thereby each representing a different predetermined count of sequential occurrences of said basic event;

(c) means including a program contact bank and said signal means for actuating said operating means during a count controlled step in response to said impulses;

(d) driving means for said step controller that when energized will advance said first stepping means a single step; and (e) means including a program contact bank and said count accumulating means for energizing said driving means to terminate said count controlled step.

18. The apparatus of claim 17 wherein said plurality of output contacts of said count accumulating means represent away positions that are sequentially selected by an associated wiper operated by said second stepping means upon the energization of said operating means by said impulses, said away positions corresponding in number to the desired maximum multiple of said basic event to thereby represent a different multiple of said basic event, said count accumulating means having a home position representing a zero count condition, means including a program contact bank and a selected one of said output contacts for cycling said count accumulating means sequentially through all remaining away positions, to said home position, prior to the energization of said driving means at the termination of a count controlled step, and said means for energizing said driving means to terminate said count controlled step including a switch actuated by said count accumulating means in said home position.

References Cited

UNITED STATES PATENTS

| | | | |
|---|---|---|---|
| 2,817,806 | 12/1957 | Borell | 317—155.5 |
| 3,108,206 | 10/1963 | Zuhlsdorf et al. | 317—155.5 X |
| 3,174,080 | 3/1965 | Scott | 317—155.5 |
| 3,199,729 | 8/1965 | Samp | 307—132 X |
| 3,200,303 | 8/1965 | Maxwell | 307—141 X |
| 3,255,442 | 6/1966 | Kimberlin | 307—141.4 X |

ROBERT K. SCHAEFER, *Primary Examiner.*

T. B. JOIKE, *Assistant Examiner.*

U.S. Cl. X.R.

307—141.8; 317—141